United States Patent
Deng

(10) Patent No.: US 11,405,834 B2
(45) Date of Patent: Aug. 2, 2022

(54) DATA TRANSMISSION METHOD AND DEVICE

(71) Applicant: DATANG MOBILE COMMUNICATIONS EQUIPMENT CO., LTD., Beijing (CN)

(72) Inventor: Qiang Deng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/311,694

(22) PCT Filed: Nov. 18, 2019

(86) PCT No.: PCT/CN2019/119251
§ 371 (c)(1),
(2) Date: Jun. 8, 2021

(87) PCT Pub. No.: WO2020/119404
PCT Pub. Date: Jun. 18, 2020

(65) Prior Publication Data
US 2021/0368408 A1    Nov. 25, 2021

(30) Foreign Application Priority Data
Dec. 14, 2018    (CN) .......................... 201811535571.X

(51) Int. Cl.
*H04W 36/02* (2009.01)
*H04W 8/12* (2009.01)
(Continued)

(52) U.S. Cl.
CPC ............. *H04W 36/02* (2013.01); *H04W 8/12* (2013.01); *H04W 36/32* (2013.01); *H04W 60/04* (2013.01)

(58) Field of Classification Search
CPC ............. H04W 36/00; H04W 36/0022; H04W 36/0033; H04W 36/0066; H04W 36/02;
(Continued)

(56) References Cited

U.S. PATENT DOCUMENTS

2017/0374542 A1    12/2017 Ryu et al.
2020/0146077 A1*    5/2020 Li .......................... H04W 76/10

FOREIGN PATENT DOCUMENTS

CN    107548127 A    1/2018
CN    108632915 A    10/2018
(Continued)

OTHER PUBLICATIONS

3GPP TSG-SA WG2 Meeting #129 Oct. 15-19, 2018, Dongguan, P.R. China, S2-1810828 (Year: 2018).*
(Continued)

*Primary Examiner* — Nizar N Sivji
(74) *Attorney, Agent, or Firm* — Kilpatrick Townsend & Stockton, LLP

(57) ABSTRACT

The present application relates to the field of wireless communication technology, in particular to a data transmission method and device, used to solve the problem of there being no solution for sending cached downlink data in a source communication system to a UE after the UE crosses the communication system. An MME entity in a second mobile communication system of an embodiment of the present application receives a downlink data cache indication sent by an SMF entity located in a first mobile communication system; the MME entity initiates the establishment of a user plane connection and/or control plane connection of a UE, so that a user plane functional entity sends the cached downlink data to the UE by means of the user plane connection and/or control plane connection.

17 Claims, 10 Drawing Sheets

1101

An MME entity located in the second mobile communication system receives a downlink data buffering indication sent by an SMF entity located in the first mobile communication system; wherein the downlink data buffering indication is used to indicate that the downlink data of the UE is buffered in the first mobile communication system

1102

The MME entity initiates the establishment of a user plane connection and/or control plane connection of the UE, so that a user plane function entity sends the buffered downlink data to the UE through the user plane connection and/or control plane connection

(51) Int. Cl.
*H04W 36/32* (2009.01)
*H04W 60/04* (2009.01)

(58) Field of Classification Search
CPC ... H04W 36/023; H04W 36/14; H04W 36/32; H04W 8/12; H04W 60/04; H04W 28/00; H04W 28/02782; H04W 76/11; H04W 76/12; H04W 48/20; H04W 28/0278
See application file for complete search history.

(56) References Cited

FOREIGN PATENT DOCUMENTS

| | | |
|---|---|---|
| CN | 108696822 A | 10/2018 |
| CN | 108881356 A | 11/2018 |
| WO | 2018067956 A1 | 4/2018 |

OTHER PUBLICATIONS

3GPP TS 23.401, LTE; General Packet Radio Service (GPRS) enhancements for Evolved Universal Terrestrial Radio Access Network (E-UTRAN) access 3GPP TS 23.401 version 15.4.0 Release 15, Jul. 2018 (Year: 2018).*

China Mobile,"Clarifications on EPS to SGS handover procedure using N26" 3GPP T5G-5A WG2 Meeting #126, Feb. 26-Mar. 2, 2018, Montreal, Canada, total 5 pages, S2-182659(Revision of 52-182089).

LG Electronics,"Clarification on N26 based interworking procedures", 3GPP TSG-SA WG2 Meeting #128BIS, Aug. 20-24, 2018, Sophia Antipolis, France, total 8 pages, S2-187884.

Cisco Systems,"Corrections to SGS to EPS Idle mode mobility", 3GPP TSG-SA WG2 Meeting #129, Oct. 15-19, 2018, Dongguan, China, total 3 pages, S2-1810190.

Huawei et al., "Clarification on interworking with N26 interface", 3GPP TSG-SA WG2 Meeting #129, Oct. 15-19, 2018, Dongguan, P.R. China, total 9 pages, S2-1810828.

Catt,"Discussion on buffered data forwarding for interworking case", SA WG2 Meeting #131, Feb. 25-Mar. 1, 2019, Tenerife, Spain, total 4 pages, S2-1901915.

3GPP TR 23.724 V2.0.0, 3rd Generation Partnership Project;Technical Specification Group Services and System Aspects;Study on Cellular IoT support and evolution for the 5G System (Release 16), total 276 pages, Dec. 2018.

3GPP TS 23.502 V15.3.0,3rd Generation Partnership Project;Technical Specification Group Services and System Aspects; Procedures for the 5G System;Stage 2 (Release 15), total 330 pages, Sep. 2018.

* cited by examiner

ND DEVICE

The present application is a National Stage of International Application No. PCT/CN2019/119251, filed on Nov. 18, 2019, which claims the priority from Chinese Patent Application No. 201811535571.X, filed with the Chinese Patent Office on Dec. 14, 2018 and entitled "Data Transmission Method and Device", both of which are hereby incorporated by reference in their entireties.

FIELD

The present application relates to the field of wireless communication technologies and particularly to a data transmission method and device.

BACKGROUND

Since the power saving is an important design goal of a User Equipment (UE), the 3rd Generation Partnership Project (3GPP) defines two kinds of UE power saving modes: Power Saving Mode (PSM) and extended Discontinuous Reception (eDRX).

When the UE is in the power saving mode, the Access Stratum (AS) receiver will be turned off, the network cannot page the UE, and the UE is in the unreachable state. When the downlink data of the UE arrives at the network, the core network will buffer the downlink data of the UE. When the UE initiates the registration process or service request process again, the UE will restore the reachable state, and the core network sends the buffered data to the UE. However, the UE may switch across communication systems as the UE moves, for example, the UE with 4th-Generation (4G) and 5th-Generation (5G) access capabilities may move between the 4G communication system and the 5G communication system. Therefore, after the UE moves across communication system, if the UE's downlink data is buffered in the source communication system, how to send the buffered downlink data to the UE after the UE moves to the target communication system becomes an urgent problem to be solved.

To sum up, there is still no solution at present for sending the downlink data buffered in the source communication system to the UE after the UE moves across communication system.

BRIEF SUMMARY

The present application provides a data transmission method and device, to solve the problem that there is no solution for sending the downlink data buffered in the source communication system to the UE after the UE moves across communication system.

Based on the foregoing problem, in the first aspect, an embodiment of the present application provides a data transmission method, including:

receiving, by a Mobility Management Entity (MME) located in a second mobile communication system, a downlink data buffering indication sent by a Session Management Function (SMF) entity located in a first mobile communication system; and the downlink data buffering indication is used to indicate that downlink data of a UE is buffered in the first mobile communication system;

initiating, by the MME entity, the establishment of a user plane connection and/or control plane connection of the UE, so that a user plane function entity sends the buffered downlink data to the UE through the user plane connection and/or control plane connection.

In a second aspect, an embodiment of the present application provides a data transmission method, including:

determining, by an SMF entity located in a first mobile communication system, that downlink data of a UE is buffered in the first mobile communication system;

sending, by the SMF entity, a downlink data buffering indication to an MME entity located in a second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In a third aspect, an embodiment of the present application provides another data transmission method, including:

receiving, by an SMF entity located in a first mobile communication system, a downlink data buffering indication sent by an MME entity located in a second mobile communication system; and the downlink data buffering indication is used to indicate that downlink data of a UE is buffered in the second mobile communication system;

activating, by the SMF entity, a Protocol Data Unit (PDU) session connection corresponding to the buffered downlink data of the UE, so that a user plane function entity sends the buffered downlink data to the UE through the PDU session connection.

In a fourth aspect, an embodiment of the present application provides another data transmission method, including:

receiving, by an Access and Mobility Management Function (AMF) entity located in a first mobile communication system, a downlink data buffering indication sent by an MME entity located in a second mobile communication system;

forwarding, by the AMF entity, the downlink data buffering indication to an SMF entity located in the first mobile communication system, so that the SMF entity activates a PDU session connection corresponding to buffered downlink data of a UE, so that a user plane function entity sends the buffered downlink data to the UE through the PDU session connection.

In a fifth aspect, an embodiment of the present application provides another data transmission method, including:

determining, by an MME entity located in a second mobile communication system, that downlink data of a UE is buffered in a Serving GateWay (SGW) of the second mobile communication system;

sending, by the MME entity, a downlink data buffering indication to an SMF entity located in a first mobile communication system, so that the SMF entity activates a PDU session connection corresponding to the buffered downlink data of the UE, so that a user plane function entity sends the buffered downlink data to the UE through the PDU session connection.

In a sixth aspect, an embodiment of the present application provides a first MME entity, being located in a second mobile communication system and including a processor and a memory;

and the processor is configured to read a program in the memory and perform a process of:

receiving a downlink data buffering indication sent by an SMF entity located in a first mobile communication system; and the downlink data buffering indication is used to indicate that downlink data of a UE is buffered in the first mobile communication system;

initiating an establishment of a user plane connection and/or control plane connection of the UE, so that a user plane function entity sends the buffered downlink data to the UE through the user plane connection and/or control plane connection.

In a seventh aspect, an embodiment of the present application provides a first SMF entity, which is located in a first mobile communication system and includes a processor and a memory;

and the processor is configured to read a program in the memory and perform a process of:

determining that downlink data of a UE is buffered in the first mobile communication system;

sending a downlink data buffering indication to an MME entity located in a second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In an eighth aspect, an embodiment of the present application provides a second SMF entity being located in a first mobile communication system and including a processor and a memory;

and the processor is configured to read a program in the memory and perform a process of:

receiving a downlink data buffering indication sent by an MME entity located in a second mobile communication system; and the downlink data buffering indication is used to indicate that downlink data of a UE is buffered in the second mobile communication system;

activating a PDU session connection corresponding to the buffered downlink data of the UE, so that a user plane function entity sends the buffered downlink data to the UE through the PDU session connection.

In a ninth aspect, an embodiment of the present application provides an AMF entity, being located in a first mobile communication system and including a processor and a memory;

and the processor is configured to read a program in the memory and perform a process of:

receiving a downlink data buffering indication sent by an MME entity located in a second mobile communication system;

forwarding the downlink data buffering indication to an SMF entity located in the first mobile communication system, so that the SMF entity activates a PDU session connection corresponding to buffered downlink data of a UE, so that a user plane function entity sends the buffered downlink data to the UE through the PDU session connection.

In a tenth aspect, an embodiment of the present application provides a second MME entity, being located in a second mobile communication system and including a processor and a memory;

and the processor is configured to read a program in the memory and perform a process of:

determining that downlink data of a UE is buffered in an SGW of the second mobile communication system;

sending a downlink data buffering indication to an SMF entity located in a first mobile communication system, so that the SMF entity activates a PDU session connection corresponding to the buffered downlink data of the UE, so that a user plane function entity sends the buffered downlink data to the UE through the PDU session connection.

In an eleventh aspect, an embodiment of the present application provides a third MME entity, being located in a second mobile communication system and including:

a first receiving device configured to receive a downlink data buffering indication sent by an SMF entity located in a first mobile communication system; and the downlink data buffering indication is used to indicate that downlink data of a UE is buffered in the first mobile communication system;

a first processing device configured to initiate the establishment of a user plane connection and/or control plane connection of the UE, so that a user plane function entity sends the buffered downlink data to the UE through the user plane connection and/or control plane connection.

In a twelfth aspect, the embodiments of the present application provide a third SMF entity, being located in the first mobile communication system and including:

a first determining device configured to determine that downlink data of a UE is buffered in the first mobile communication system;

a first sending device configured to send a downlink data buffering indication to an MME entity located in a second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In a thirteenth aspect, an embodiment of the present application provides a fourth SMF entity, being located in a first mobile communication system and including:

a second receiving device configured to receive a downlink data buffering indication sent by an MME entity located in a second mobile communication system; and the downlink data buffering indication is used to indicate that downlink data of a UE is buffered in the second mobile communication system;

a second processing device configured to activate a PDU session connection corresponding to the buffered downlink data of the UE, so that a user plane function entity sends the buffered downlink data to the UE through the PDU session connection.

In a fourteenth aspect, an embodiment of the present application provides another AMF entity, being located in a first mobile communication system and including:

a third receiving device configured to receive a downlink data buffering indication sent by an MME entity located in a second mobile communication system;

a second sending device configured to forward the downlink data buffering indication to an SMF entity located in the first mobile communication system, so that the SMF entity activates a PDU session connection corresponding to buffered downlink data of a UE, so that a user plane function entity sends the buffered downlink data to the UE through the PDU session connection.

In a fifteenth aspect, the embodiments of the present application provide a fourth MME entity, being located in a second mobile communication system and including:

a second determining device configured to determine that downlink data of a UE is buffered in an SGW of the second mobile communication system;

a third sending device configured to send a downlink data buffering indication to an SMF entity located in a first mobile communication system, so that the SMF entity activates a PDU session connection corresponding to the buffered downlink data of the UE, so that a user plane function entity sends the buffered downlink data to the UE through the PDU session connection.

In a sixteenth aspect, an embodiment of the present application provides a computer storable medium storing a computer program thereon, where the program, when executed by a processor, implements the steps of the method described in the above first aspect or implements the steps of the method described in the above second aspect.

In a seventeenth aspect, an embodiment of the present application provides another computer storable medium storing a computer program thereon, where the program, when executed by a processor, implements the steps of the method described in the above third aspect, or implements the steps of the method described in the above fourth aspect, or implements the steps of the method described in the above fifth aspect.

In the embodiments of the present application, after the UE moves from the first mobile communication system to the second mobile communication system, the MME entity in the second mobile communication system establishes a user plane and/or control plane connection of the UE after receiving the downlink data buffering indication sent by the SMF entity in the first mobile communication system, and the buffered downlink data of the UE is sent to the UE through the established user plane and/or control plane, and providing a way to send the downlink data buffered in the first mobile communication system to the UE through the user plane and/or control plane connection established by the second mobile communication system after the UE moves to the second mobile communication system, avoiding the loss of the buffered downlink data of the UE, improving the system reliability, and further improving the system performance.

After the UE moves from the second mobile communication system to the first mobile communication system, the SMF entity in the first mobile communication system receives the downlink data buffering indication sent by the MME entity in the second mobile communication system, and then activates the PDU session connection corresponding to the buffered downlink data of the UE and sends the buffered downlink data of the UE to the UE through the activated PDU session connection, and providing a way to send the downlink data buffered in the second mobile communication system to the UE through the activated PDU session connection in the first mobile communication system after the UE moves to the first mobile communication system, avoiding the loss of the buffered downlink data of the UE, improving the system reliability, and further improving the system performance.

DETAILED DESCRIPTION OF THE EMBODIMENTS (1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "l" generally indicates that the associated objects have a kind of "or" relationship.

The network architectures and service scenarios described in the embodiments of the present application are intended to illustrate the embodiments of the present application more clearly, and do not constitute a limitation on the solutions provided in the embodiments of the present application. With the evolution of network architectures and the emergence of new service scenarios, the embodiments of the present application are also applicable to similar problems.

The present application will be described below in detail with reference to the drawings.

In order to support the mobility of the UE between the Evolved Packet System (EPS)(or called 4G system) and 5G system, the 3GPP defines the interworking architecture between the EPS system and 5G system.

Figure 1:
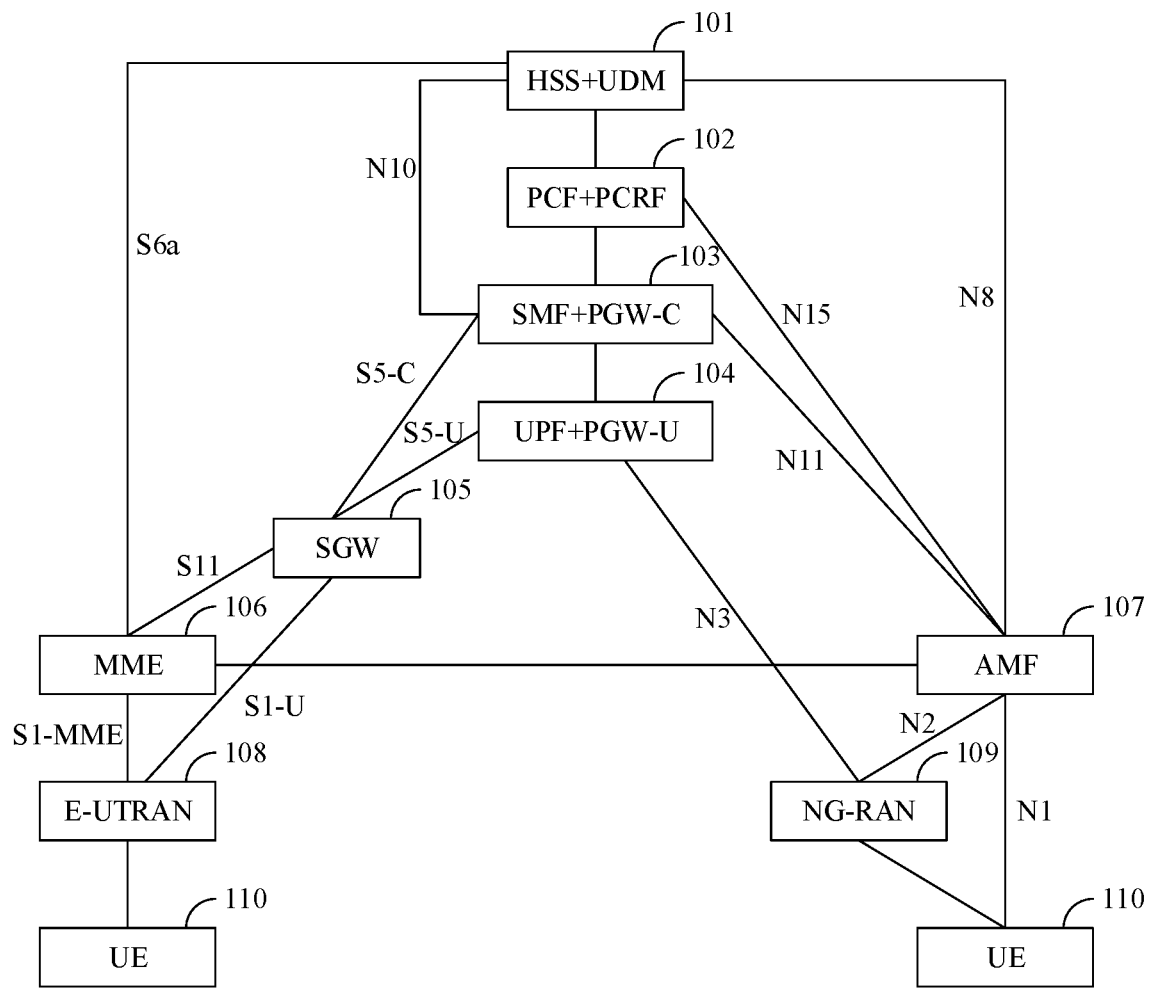
FIG. 1 is a schematic diagram of a system architecture of an embodiment of the present application.

The network interworking architecture is as shown in FIG. 1. In this architecture, the Home Subscriber Server (HSS) in the EPS system and the Unified Data Management (UDM) entity in the 5GS system are jointly set up, and can be expressed as HSS+UDM 101.

Here, the joint setting can be understood as combining two into one, that is, the HSS and UDM are set together to form one structure.

The Policy and Charging Rules Function (PCRF) in the EPS system and the Policy Control Function (PCF) in the 5GS system are jointly set up, and can be expressed as PCF+PCRF 102.

The Packet Data Network GateWay-Control Plane (PGW-C) in the EPS system and the Session Management Function (SMF) in the 5GS system are jointly set up, and can be expressed as SMF+PGW-C 103.

The Packet Data Network GateWay-User Plane (PGW-U) in the EPS system and the User Plane Function (UPF) in the 5GS system are jointly set up, can be expressed as UPF+PGW-U 104, and are collectively referred to as a user plane function entity in the embodiments of the present application.

The N26 interface is defined between the Mobility Management Entity (MME) 106 in the EPS system and the Access and Mobility Management Function (AMF) 107 in the 5G system, and is used to transfer the context information of the UE between the EPS system and 5G system.

In the EPS system, the UE 110 can communicate with the core network via the Evolved Universal Terrestrial Radio Access Network (E-UTRAN) 108.

In the 5GS system, the UE 110 can communicate with the core network via the Next Generation-Radio Access Network (NG-RAN).

The UE 110 may refer to an access terminal, a user unit, a user station, a mobile radio station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-carried device, a wearable device, an Internet of Things (IoT) device, etc.

It should be noted that the foregoing system architecture is only an example of the system architecture applicable to the embodiments of the present application. Compared with the system architecture shown in FIG. 1, the system architecture applicable to the embodiments of the present application can also add other entities or reduce some entities.

The embodiments of the present application are applied to a scenario where the 5GS and EPS are interconnected. In this scenario, the UE has both 4G and 5G access capabilities, and the UE can move between the EPS system and the 5G system.

In an embodiment of the present application, the UE moves across systems in the idle state; specifically, the UE is in the idle state in the source mobile communication system, and the source mobile communication system has the buffered downlink data of the UE, and the downlink data of the UE buffered in the source communication system is sent to the UE through the target communication system after the UE moves to the target communication system.

The application scenarios of the embodiments of the present application are:

1. A UE moves from a first mobile communication system to a second mobile communication system, and the downlink data of the UE is buffered in the first mobile communication system;

2. A UE moves from the second mobile communication system to the first mobile communication system, and the downlink data of the UE is buffered in the second mobile communication system.

In an embodiment, the first mobile communication system is an EPS system, and the second mobile communication system is a 5GS system.

It should be noted that, in the EPS system, the downlink data of the UE is buffered in a Serving GateWay (SGW); and in the 5GS system, the downlink data of the UE is buffered in a user plane function entity or an SMF entity.

Different scenarios will be illustrated below respectively.

1. A UE moves from the first mobile communication system to the second mobile communication system.

In one embodiment, the first mobile communication system is an EPS system, and the second mobile communication system is a 5GS system.

Figure 2:
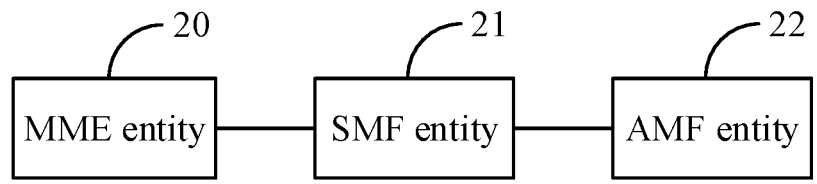
FIG. 2 is a structural schematic diagram of a first data transmission system of an embodiment of the present application.

As shown in FIG. 2, a data transmission system of an embodiment of the present application includes: an MME entity 20, an SMF entity 21, and an AMF entity 22.

Here, the SMF entity 21 is located in the first mobile communication system, the MME entity 20 is located in the second mobile communication system, and the AMF entity 22 is located in the first mobile communication system.

The SMF entity can be used to perform a part of functions of the MME entity in the first mobile communication system, is mainly responsible for establishing and managing sessions for the UE, and can select a suitable user plane function entity for the UE according to the location information of the UE.

The main functions of the AMF entity include the termination point of the control plane of the wireless access network, the termination point of non-access signaling, the mobility management, the lawful monitoring, the access authorization or authentication, and so on.

The MME entity 20 is configured to receive a downlink data buffering indication sent by the SMF entity; and the downlink data buffering indication is used to indicate that the downlink data of the UE is buffered in the first mobile communication system; and initiate the establishment of the user plane connection and/or control plane connection of the UE, so that the user plane function entity sends the buffered downlink data to the UE through the user plane connection and/or control plane connection.

The SMF entity 21 is configured to determine that the downlink data of the UE is buffered in the first mobile communication system; and send the downlink data buffering indication to the MME entity, so that the MME entity initiates the establishment of the user plane connection and/or control plane connection of the UE after receiving the downlink data buffering indication, so that the user plane function entity sends the buffered downlink data to the UE through the user plane connection and/or control plane connection.

The AMF entity 22 is configured to receive the downlink data buffering indication sent by the SMF entity, and send the downlink data buffering indication to the MME entity.

It should be noted that the N26 interface is defined between the AMF entity and the MME entity, so there is a need to forward the downlink data buffering indication through the AMF entity when the SMF entity needs to send the downlink data buffering indication to the MME entity.

Since the UE moves across systems in the idle state in the embodiment of the present application, the UE is in the unreachable state in the first mobile communication system, and the AMF entity records the UE's state as unreachable.

Here, the downlink data of the UE buffered in the first mobile communication system includes but is not limited to: the downlink data of the UE buffered in the user plane function entity, and the downlink data of the UE buffered in the SMF entity.

When the SMF entity determines that the downlink data of the UE is buffered in the first mobile communication system, the following methods may be used:

1. The SMF entity determines that it buffers the downlink data of the UE;
2. The SMF entity determines that the downlink data of the UE is buffered in the user plane function entity.

Before the SMF entity determines that the downlink data of the UE is buffered in the first mobile communication system and sends the downlink data buffering indication to the MME entity, the SMF entity also needs to determine that the current UE is in the reachable state.

In one mode, the AMF entity notifies the SMF entity that the UE is in the reachable state in the second mobile communication system.

In one embodiment, after the UE in the idle state moves from the first mobile communication system to the second mobile communication system, the UE sends a first request message to the MME entity; and the first request message is a Tracking Area Update (TAU) message.

After receiving the first request message sent by the UE, the MME entity sends a second request message for requesting the context information of the UE to the AMF entity; and the second request message is a context request message for requesting the context of the UE.

In an implementation, the MME entity sends the second request message to the AMF entity through the N26 interface.

After receiving the second request message, the AMF entity determines that the UE is in the reachable state after moving to the second mobile communication system, and notifies the SMF entity.

In one embodiment, the AMF entity notifies the SMF entity that the UE is in the reachable state in the second mobile communication system in the following way:

the AMF entity sends a third request message to the SMF entity;

after receiving the third request message, the SMF entity determines that the UE is in the reachable state after moving to the second mobile communication system.

Here, the third request message is used to request the session management context information of the UE.

When the downlink data of the UE is buffered in the first mobile communication system, the SMF entity sends the downlink data buffering indication after determining that the UE is in the reachable state.

It should be noted that when the downlink data of the UE is buffered in the SMF entity, the SMF entity forwards the buffered downlink data of the UE to the user plane function entity after determining that the UE is in the reachable state in the second mobile communication system.

In an optional mode, after receiving the third request message and determining that the UE is in the reachable state in the second mobile communication system, the SMF entity sends the downlink data buffering indication and the session management context information of the UE to the AMF entity.

Correspondingly, the AMF entity returns the downlink data buffering indication and the context information of the UE to the MME entity.

After receiving the downlink data buffering indication, the MME entity determines to establish a user plane connection and/or control plane connection according to the context information of the UE.

In one embodiment, the MME entity determines the type of connection establishment according to the context information of the UE.

The MME entity can determine the established connection type according to the Packet Data NetWorks (PDN) connection type in the context information of the UE; for example, determine to establish a control plane connection when the PDN connection type is Control Plane only.

In one embodiment, the MME entity determines the connection type according to the result of the previous negotiation with the UE, and the UE and the MME entity negotiate the connection type during the Attach and TAU process.

It should be noted that the user plane connection in the embodiments of the present application refers to a connection in which the downlink data is sent to a base station via an SGW and then sent by the base station to the UE via a data radio bearer; and the control plane connection refers to a connection in which the downlink data is sent to the MME entity via the SGW and then sent by the MME entity to the UE via an NAS message.

After establishing the user plane connection and/or control plane connection of the UE, the user plane function entity sends the buffered downlink data to the UE through the established user plane connection and/or control plane connection.

It should be noted here that, in the network architecture of the embodiments of the present application, the user plane function entities in the EPS system and the 5GS system are jointly set up. The user plane function entity in the EPS system can be called PGW-G, and the user plane function entity in the 5GS system can be called UPF entity. Therefore, when the downlink data of the UE is buffered in the user plane function entity of the first mobile communication system, the user plane function entity can issue the buffered downlink data of the UE to the UE through the user plane connection and/or control plane connection of the UE established in the second mobile communication system after the UE moves to the second mobile communication system.

The data transmission methods of the embodiments of the present application will be Illustrated Below in Detail Through Two Embodiments.

First Embodiment

In the first embodiment, a UE moves from the 5GS system to the EPS system, and the downlink data of the UE is buffered in the user plane function entity of the 5GS system.

Figure 3:
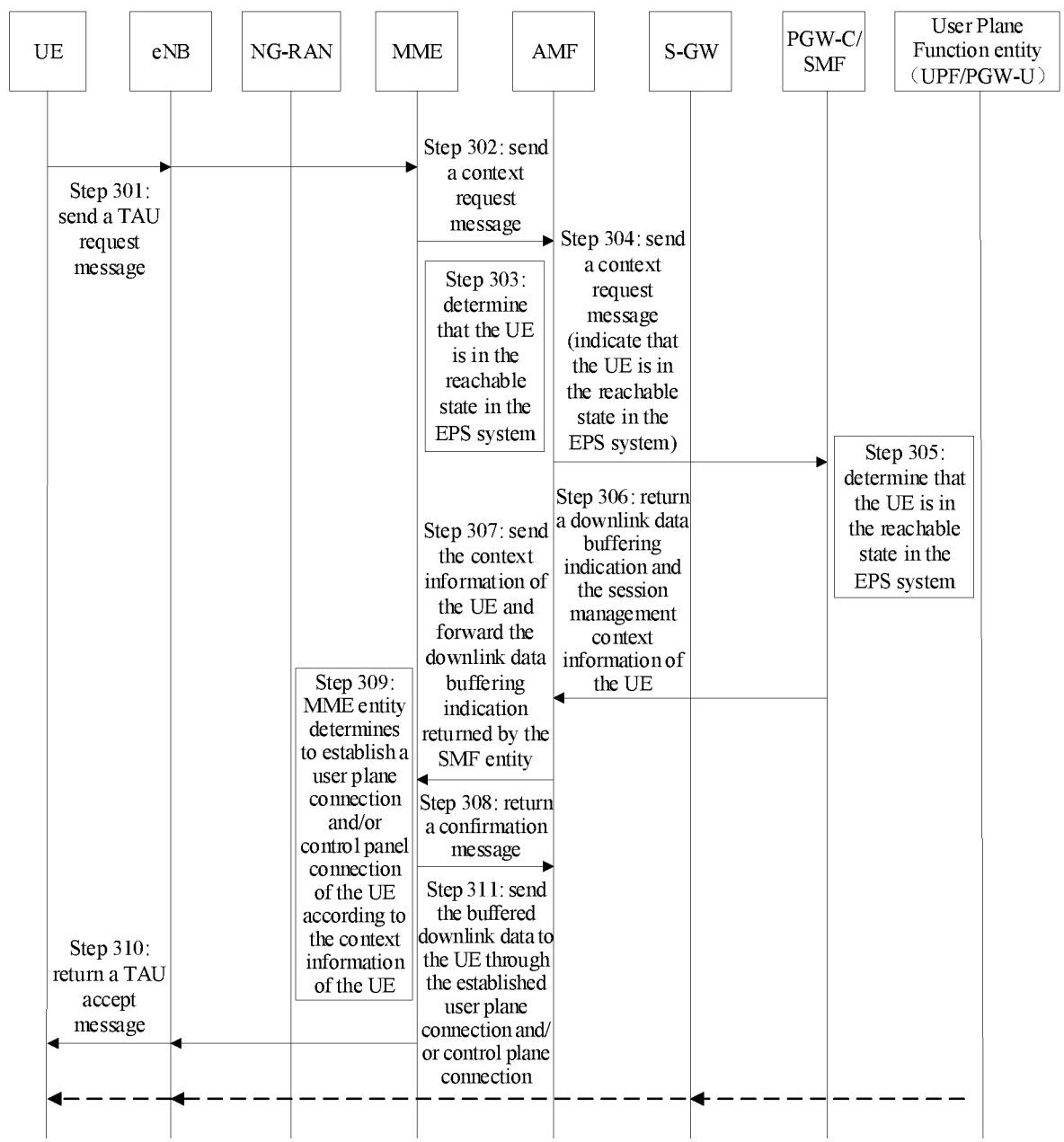
FIG. 3 is a first data transmission flowchart of an embodiment of the present application.

As shown in FIG. 3, a data transmission flowchart of an embodiment of the present application is shown.

Step 301: the UE sends a TAU request message to the MME entity.

Here, the UE sends the TAU request message to the MME entity through an evolved Node B (eNB).

Step 302: the MME entity sends a context request message to the AMF entity.

In one embodiment, the MME entity sends the context request message to the AMF entity through the N26 interface.

Step 303: the AMF entity determines that the UE is in the reachable state in the EPS system.

Step 304: the AMF entity sends a context request message to the SMF entity and indicates that the UE is in the reachable state in the EPS system.

Here, the context request message is used to request the session management context information.

Step 305: the SMF entity determines that the UE is in the reachable state in the EPS system.

Step 306: the SMF entity returns a downlink data buffering indication and the session management context information of the UE to the AMF entity.

Step 307: the AMF entity sends the context information of the UE and forwards the downlink data buffering indication returned by the SMF entity to the MME entity.

Step 308: the MME entity returns a confirmation message to the AMF entity.

Step 309: the MME entity determines to establish a user plane connection and/or control panel connection of the UE according to the context information of the UE.

Here, the user plane connection of the UE refers to a connection in which the downlink data is sent to a base station via an SGW and then sent by the base station to the UE via a data radio bearer.

In one embodiment, the MME entity requests to restore the S5 bearer between the SGW and the PGW, and requests the eNB to restore the radio bearer and the S1 bearer.

The control plane connection of the UE refers to a connection in which the downlink data is sent to the MME entity via the SGW and then sent by the MME entity to the UE via an NAS message.

In one embodiment, the MME entity establishes the S11 bearer with the SGW.

Step 310: the MME entity returns a TAU accept message to the UE.

In one embodiment, the MME entity returns the TAU accept message to the UE through the base station (eNB).

Step 311: the user plane function entity sends the buffered downlink data to the UE through the established user plane connection and/or control plane connection.

Second Embodiment

A UE moves from the 5GS system to the EPS system, and the downlink data of the UE is buffered in the SMF entity of the 5GS system.

Figure 4:
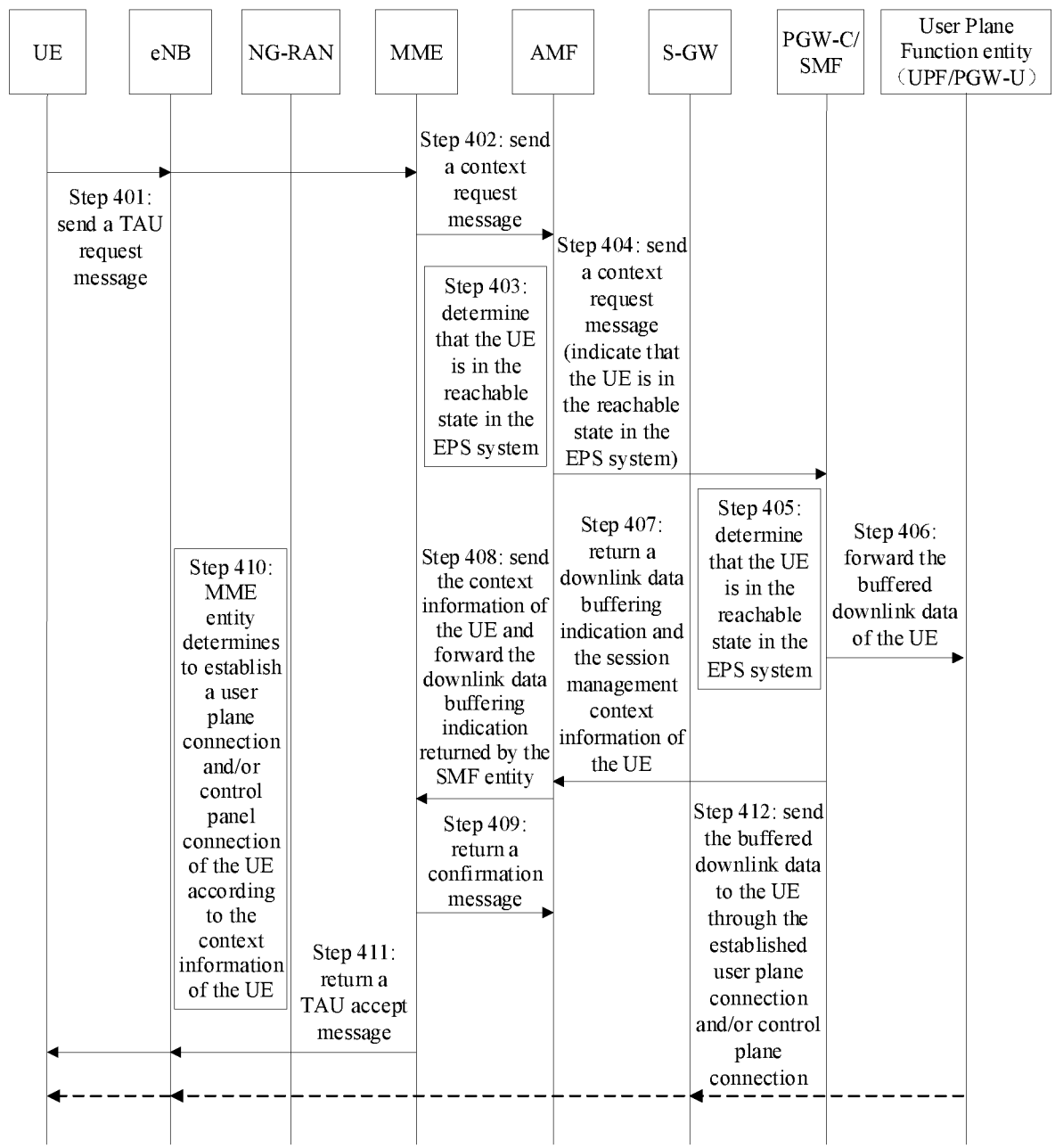
FIG. 4 is a second data transmission flowchart of an embodiment of the present application.

As shown in FIG. 4, a data transmission flowchart of an embodiment of the present application is shown.

Step 401: the UE sends a TAU request message to the MME entity.

Here, the UE sends the TAU request message to the MME entity through a base station (eNB).

Step 402: the MME entity sends a context request message to the AMF entity.

In one embodiment, the MME entity sends the context request message to the AMF entity through the N26 interface.

Step 403: the AMF entity determines that the UE is in the reachable state in the EPS system.

Step 404: the AMF entity sends a context request message to the SMF entity and indicates that the UE is in the reachable state in the EPS system.

Here, the context request message is used to request the session management context information.

Step 405: the SMF entity determines that the UE is in the reachable state in the EPS system.

Step 406: the SMF entity forwards the buffered downlink data of the UE to the user plane function entity.

Step 407: the SMF entity returns a downlink data buffering indication and the session management context information of the UE to the AMF entity.

Step 408: the AMF entity sends the context information of the UE and forwards the downlink data buffering indication returned by the SMF entity to the MME entity.

Step 409: the MME entity returns a confirmation message to the AMF entity.

Step 410: the MME entity determines to establish a user plane connection and/or control panel connection of the UE according to the context information of the UE.

Here, the user plane connection of the UE refers to a connection in which the downlink data is sent to a base station via an SGW and then sent by the base station to the UE via a data radio bearer.

In one embodiment, the MME entity requests to restore the S5 bearer between the SGW and the PGW, and requests the eNB to restore the radio bearer and the S1 bearer.

The control plane connection of the UE refers to a connection in which the downlink data is sent to the MME entity via the SGW and then sent by the MME entity to the UE via an NAS message.

In one embodiment, the MME entity establishes the S11 bearer with the SGW.

Step 411: the MME entity returns a TAU accept message to the UE.

In one embodiment, the MME entity returns the TAU accept message to the UE through the base station (eNB).

Step 412: the user plane function entity sends the buffered downlink data to the UE through the established user plane connection and/or control plane connection.

2. A UE moves from the second mobile communication system to the first mobile communication system.

In one embodiment, the first mobile communication system is an EPS system, and the second mobile communication system is a 5GS system.

Figure 5:
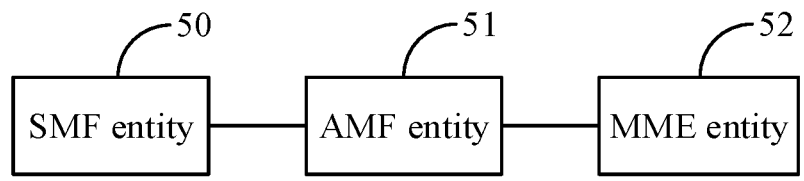
FIG. 5 is a structural schematic diagram of a second data transmission system of an embodiment of the present application.

As shown in FIG. 5, a data transmission system of an embodiment of the present application includes: an SMF entity 50, an AMF entity 51, and an MME entity 52.

Here, the SMF entity 50 is located in the first mobile communication system, the AMF entity 51 is located in the first mobile communication system, and the MME entity 52 is located in the second mobile communication system.

The SMF entity can be used to perform a part of functions of the MME entity in the first mobile communication system, is mainly responsible for establishing and managing sessions for the UE, and can select a suitable user plane function entity for the UE according to the location information of the UE.

The main functions of the AMF entity include the termination point of the control plane of the wireless access network, the termination point of non-access signaling, the mobility management, the lawful monitoring, the access authorization or authentication, and so on.

The SMF entity 50 is configured to receive a downlink data buffering indication sent by the MME entity; and the downlink data buffering indication is used to indicate that the downlink data of the UE is buffered in the second mobile communication system; and activate a PDU session connection corresponding to the buffered downlink data of the UE, so that the user plane function entity sends the buffered downlink data to the UE through the PDU session connection.

The AMF entity 51 is configured to receive the downlink data buffering indication sent by the MME entity; and forward the downlink data buffering indication to the SMF entity, so that the SMF entity activates the PDU session connection corresponding to the buffered downlink data of the UE, so that the user plane function entity sends the buffered downlink data to the UE through the PDU session connection.

The MME entity 52 is configured to determine that the downlink data of the UE is buffered in the SGW of the second mobile communication system; and send the downlink data buffering indication to the SMF entity, so that the SMF entity activates the PDU session connection corresponding to the buffered downlink data of the UE, so that the user plane function entity sends the buffered downlink data to the UE through the PDU session connection.

Here, when the MME entity of the embodiment of the present application sends the downlink data buffering indication to the SMF entity, the MME entity sends the downlink data buffering indication to the AMF entity, and the AMF entity forwards the downlink data buffering indication to the SMF entity.

It should be noted that the N26 interface is defined between the AMF entity and the MME entity, so there is a need to forward the downlink data buffering indication through the AMF entity when the SMF entity 50 needs to send the downlink data buffering indication to the MME entity.

Since the UE moves across systems in the idle state in the embodiment of the present application, the UE is in the unreachable state in the second mobile communication system.

In an optional mode, the downlink data of the UE buffered in the second mobile communication system is buffered in the SGW, and the MME entity requests the SGW to forward the buffered downlink data of the UE to the user plane function entity after the MME entity determines that the UE is in the reachable state in the first mobile communication system.

In an implementation, the SGW forwards the buffered downlink data of the UE to the user plane function entity through the S5 interface.

In one embodiment, the MME entity determines that the UE is in the reachable state in the first mobile communication system in the following way:

the AMF entity receives a fourth request message sent by the UE;

and the fourth request message is sent after the UE moves from the second mobile communication system to the first mobile communication system; and optionally, the fourth request message is a registration request message;

the AMF entity sends a fifth request message for requesting the context information of the UE to the MME entity;

optionally, the fifth request message is a context request message;

after receiving the fifth request message, the MME entity determines that the UE is in the reachable state in the first mobile communication system.

After the MME entity determines that the UE is in the reachable state in the first mobile communication system and determines that the downlink data of the UE is buffered in the SGW of the second mobile communication system, the MME entity sends a downlink data buffering indication to the AMF entity.

In addition, the MME entity sends the EPS bearer identifier corresponding to the buffered downlink data of the UE to the AMF entity.

It should be noted here that the MME entity in this embodiment of the present application sends the downlink data buffering indication and the EPS bearer identifier corresponding to the buffered downlink data to the AMF entity through a single command.

In one embodiment, the MME entity sends the downlink data buffering indication and the EPS bearer identifier corresponding to the buffered downlink data to the AMF entity through different commands; and the order in which the MME entity sends the downlink data buffering indication and the EPS bearer identifier corresponding to the buffered downlink data to the AMF entity is not limited.

After receiving the EPS bearer identifier corresponding to the buffered downlink data of the UE sent by the MME entity, the AMF entity maps the EPS bearer identifier to a PDU session identifier.

The AMF entity determines the SMF entity associated with the PDU session according to the PDU session identifier, and sends the PDU session identifier to the determined SMF entity.

Correspondingly, the SMF entity determines the PDU session connection that needs to be activated according to the PDU session identifier sent by the AMF entity.

In addition, the AMF entity forwards the downlink data buffering indication sent by the MME entity to the SMF entity.

It should be noted here that the AMF entity can send the PDU session identifier and the downlink data buffering indication to the SMF entity through a single signaling, or the AMF entity can send the PDU session identifier and the downlink data buffering indication to the SMF entity through different signals.

In an optional mode, the AMF entity sends a context update request message to the SMF entity, and the context update request message carries the downlink data buffering indication and the PDU session identifier.

After determining the PDU session connection that needs to be activated according to the PDU session identifier sent by the AMF entity, the SMF entity activates the PDU session connection corresponding to the PDU session identifier.

After the SMF entity activates the PDU session connection corresponding to the PDU session identifier, the user plane function entity sends the buffered downlink data to the UE through the activated PDU session connection.

It should be noted here that, in the network architecture of the embodiments of the present application, the user plane function entities in the EPS system and the 5GS system are jointly set up. The user plane function entity in the EPS system can be called PGW-G, and the user plane function entity in the 5GS system can be called UPF entity. Therefore, when the downlink data of the UE is buffered in the user plane function entity of the second mobile communication system, the user plane function entity can issue the buffered downlink data of the UE to the UE through the PDU session connection of the UE established in the first mobile communication system after the UE moves to the first mobile communication system.

The data transmission method of the embodiment of the present application will be illustrated below in detail through an embodiment.

Third Embodiment

In the third embodiment, a UE moves from the EPS system to the 5GS system, and the downlink data of the UE is buffered in the SGW of the EPS system.

Figure 6:
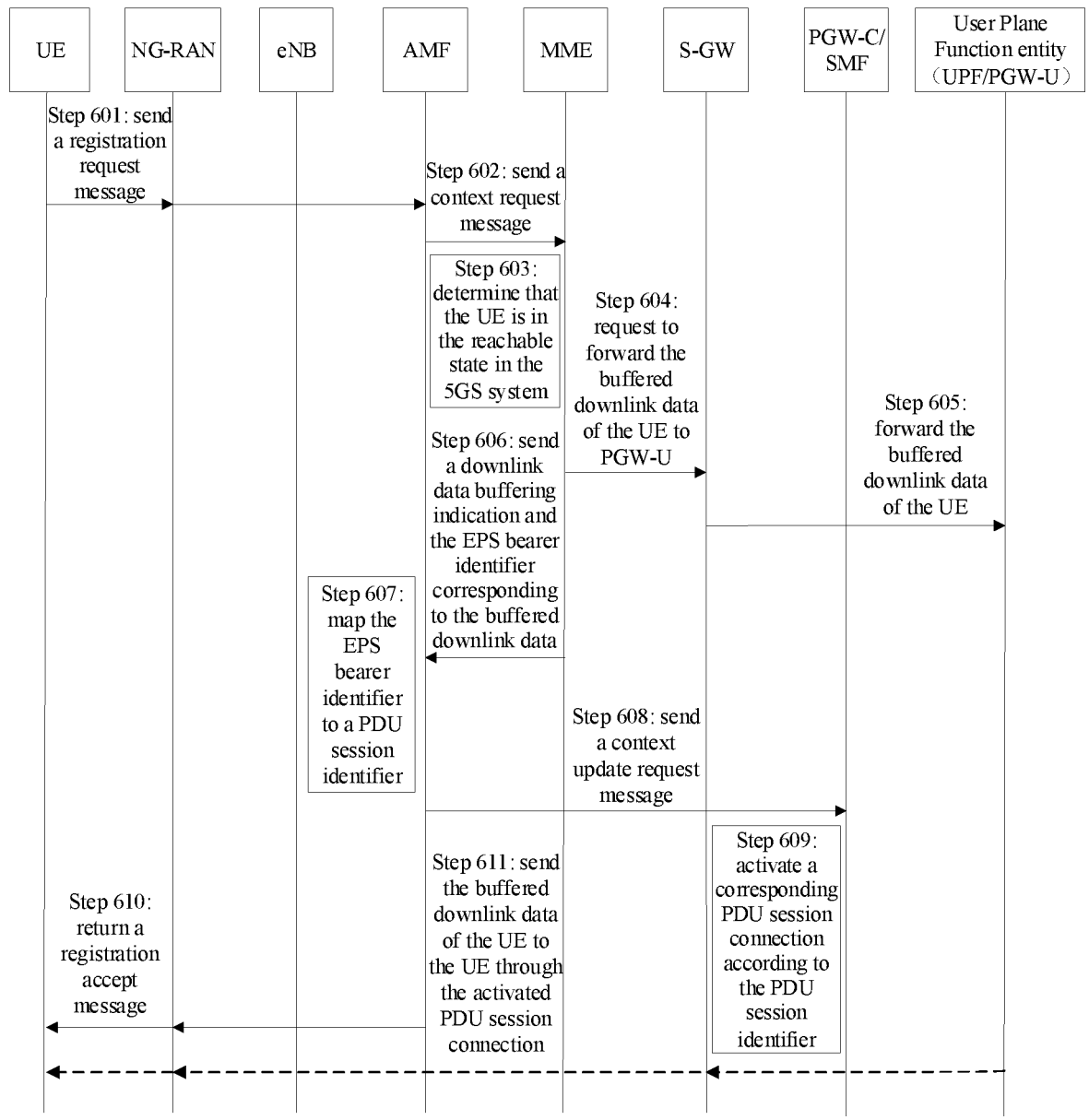
FIG. 6 is a third data transmission flowchart of an embodiment of the present application.

As shown in FIG. 6, a data transmission flowchart of an embodiment of the present application is shown.

Step 601: the UE sends a registration request message to the AMF entity.

Here, the UE sends the registration request message to the AMF entity through the NG-RAN.

Step 602: the AMF entity sends a context request message to the MME entity.

In one embodiment, the AMF entity sends the context request message to the MME entity through the N26 interface.

Step 603: the MME entity determines that the UE is in the reachable state in the 5GS system.

Step 604: the MME entity requests the SGW to forward the buffered downlink data of the UE to the user plane function entity.

Step 605: the SGW forwards the buffered downlink data of the UE to the user plane function entity.

In one embodiment, the SGW forwards the buffered downlink data of the UE to the user plane function entity through the S5 interface.

Step 606: the MME entity sends a downlink data buffering indication to the AMF entity, and the MME entity sends the EPS bearer identifier corresponding to the buffered downlink data to the AMF entity.

In one embodiment, the MME entity sends the downlink data buffering indication and the EPS bearer identifier corresponding to the buffered downlink data to the AMF entity through a response message.

Step 607: the AMF entity maps the EPS bearer identifier to a PDU session identifier.

Step 608: the AMF entity sends a context update request message to the SMF entity.

Here, the context update request message includes the downlink data buffering indication and the PDU session identifier.

Step 609: the SMF entity activates a corresponding PDU session connection according to the PDU session identifier after receiving the downlink data buffering indication.

Step 610: the AMF entity returns a registration accept message to the UE.

Step 611: the user plane function entity sends the buffered downlink data of the UE to the UE through the activated PDU session connection.

Figure 7:
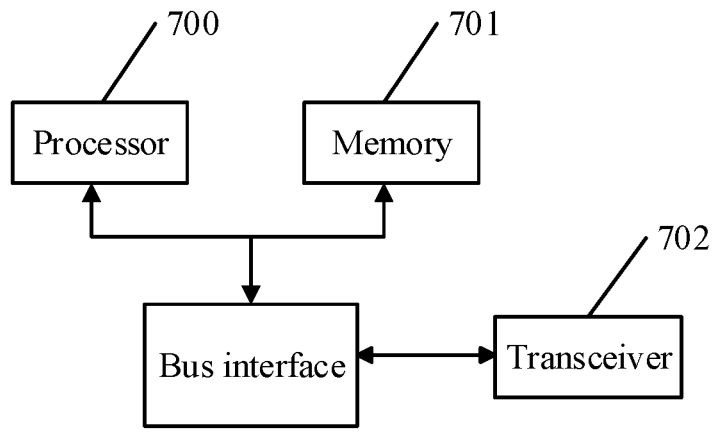
FIG. 7 is a structural schematic diagram of a first MME entity of an embodiment of the present application.

As shown in FIG. 7, an embodiment of the present application provides a first MME entity, which is located in a second mobile communication system and includes: a processor 700, a memory 701, a transceiver 702 and a bus interface.

The processor 700 is responsible for managing the bus architecture and general processing, and the memory 701 may store the data used by the processor 700 when performing the operations. The transceiver 702 is configured to receive and send the data under the control of the processor 700.

The bus architecture may include any numbers of interconnected buses and bridges, and specifically link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by the embodiment of the present application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with its hardware.

In one embodiment, the processor 700 is configured to read the program in the memory 701 and perform:

receive a downlink data buffering indication sent by an SMF entity located in a first mobile communication system; and the downlink data buffering indication is used to indicate that the downlink data of a UE is buffered in the first mobile communication system;

initiate the establishment of a user plane connection and/or control plane connection of the UE, so that a user plane function entity sends the buffered downlink data to the UE through the user plane connection and/or control plane connection.

In one embodiment, the processor 700 is configured to:

receive the downlink data buffering indication sent by the SMF entity through an AMF entity in the first mobile communication system.

In one embodiment, the processor 700 is further configured to:

receive a first request message sent by the UE before receiving the downlink data buffering indication sent by the SMF entity in the first mobile communication system; and the first request message is sent after the UE moves from the first mobile communication system to the second mobile communication system;

send a second request message for requesting the context information of the UE to the AMF entity in the first mobile communication system, so that the AMF entity determines that the UE is in a reachable state after moving to the second mobile communication system and notifies the SMF entity after receiving the second request message, so that the SMF entity sends the downlink data buffering indication after determining that the UE is in the reachable state.

In one embodiment, the first request message is a TAU request message.

In one embodiment, the downlink data of the UE is buffered in a user plane function entity of the first mobile communication system;

or, the downlink data of the UE is buffered in the SMF entity of the first mobile communication system.

In one embodiment, the processor 700 is configured to:

determine to establish a user plane connection and/or control plane connection according to the context information of the UE.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

Figure 8:
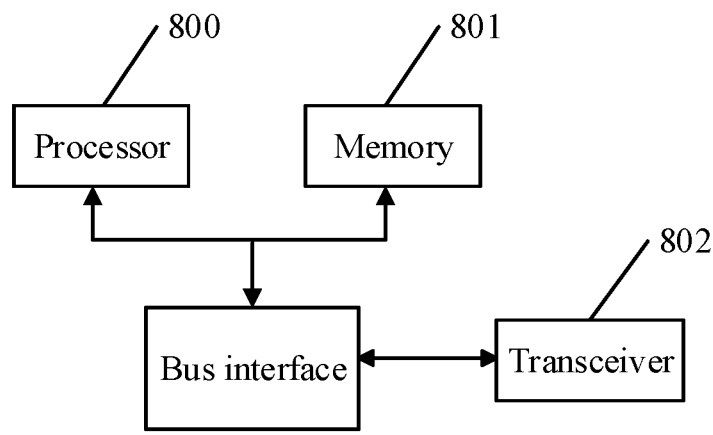
FIG. 8 is a structural schematic diagram of a first SMF entity of an embodiment of the present application.

As shown in FIG. 8, an embodiment of the present application provides a first SMF entity, which is located in a first mobile communication system and includes a processor 800, a memory 801, a transceiver 802 and a bus interface.

The processor 800 is responsible for managing the bus architecture and general processing, and the memory 801 may store the data used by the processor 800 when performing the operations. The transceiver 802 is configured to receive and send the data under the control of the processor 800.

The bus architecture may include any numbers of interconnected buses and bridges, and specifically link various circuits of one or more processors represented by the processor 800 and the memory represented by the memory 801. The bus architecture may further link various other circuits such as peripheral device, voltage regulator and power management circuit, which are all well known in the art and thus will not be further described again herein. The bus interface provides an interface. The processor 800 is responsible for managing the bus architecture and general processing, and the memory 801 may store the data used by the processor 800 when performing the operations.

The procedure disclosed by the embodiment of the present application may be applied in the processor 800 or implemented by the processor 800. In the implementation process, each step of the signal processing flow may be completed by the integrated logic circuit of hardware in the processor 800 or the instruction in the form of software. The processor 800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 801, and the processor 800 reads the information in the memory 801 and completes the steps of the signal processing flow in combination with its hardware.

In one embodiment, the processor 800 is configured to read the program in the memory 801 and perform a process of:

determining that the downlink data of a UE is buffered in the first mobile communication system;

sending a downlink data buffering indication to an MME entity located in a second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In one embodiment, the processor 800 is configured to:

send the downlink data buffering indication to an AMF entity in the first mobile communication system, and send the downlink data buffering indication to the MME entity through the AMF entity.

In one embodiment, the processor 800 is configured to:

determine that the SMF entity buffers the downlink data of the UE;

or, determine that the downlink data of the UE is buffered in the user plane function entity.

In one embodiment, the processor 800 is further configured to:

receive a third request message sent by the AMF entity for requesting the session management context information of the UE before sending the downlink data buffering indication to the MME entity located in the second mobile communication system; and the third request message is sent after the AMF entity receives a second request message sent by the MME entity for requesting the context information of the UE and determines that the UE is in a reachable state;

determine that the UE is in the reachable state after moving to the second mobile communication system.

In one embodiment, the processor 800 is further configured to:

forward the buffered downlink data of the UE to the user plane function entity after determining that the UE is in the reachable state after moving to the second mobile communication system when the downlink data of the UE is buffered in the SMF entity.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

Figure 9:
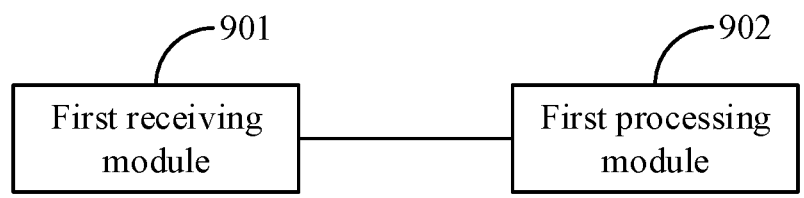
FIG. 9 is a structural schematic diagram of a second MME entity of an embodiment of the present application.

As shown in FIG. 9, an embodiment of the present application provides a second MME entity, which is located in a second mobile communication system and includes:

a first receiving device 901 configured to receive a downlink data buffering indication sent by an SMF entity located in a first mobile communication system; and the downlink data buffering indication is used to indicate that the downlink data of a UE is buffered in the first mobile communication system;

a first processing device 902 configured to initiate the establishment of a user plane connection and/or control plane connection of the UE, so that a user plane function entity sends the buffered downlink data to the UE through the user plane connection and/or control plane connection.

In one embodiment, the first receiving device 901 is configured to:

receive the downlink data buffering indication sent by the SMF entity through an AMF entity in the first mobile communication system.

In one embodiment, the first receiving device 901 is further configured to:

receive a first request message sent by the UE before receiving the downlink data buffering indication sent by the SMF entity in the first mobile communication system; and the first request message is sent after the UE moves from the first mobile communication system to the second mobile communication system;

send a second request message for requesting the context information of the UE to the AMF entity in the first mobile communication system, so that the AMF entity determines that the UE is in a reachable state after moving to the second mobile communication system and notifies the SMF entity after receiving the second request message, so that the SMF entity sends the downlink data buffering indication after determining that the UE is in the reachable state.

In one embodiment, the first request message is a TAU request message.

In one embodiment, the downlink data of the UE is buffered in a user plane function entity of the first mobile communication system;

or, the downlink data of the UE is buffered in the SMF entity of the first mobile communication system.

In one embodiment, the first processing device 902 is configured to:

determine to establish a user plane connection and/or control plane connection according to the context information of the UE.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

Figure 10:
FIG. 10 is a structural schematic diagram of a second SMF entity of an embodiment of the present application.

As shown in FIG. 10, an embodiment of the present application provides a second SMF entity, which is located in a first mobile communication system and includes:

a first determining device 1001 configured to determine that the downlink data of a UE is buffered in the first mobile communication system;

a first sending device 1002 configured to send a downlink data buffering indication to an MME entity located in a second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In one embodiment, the first sending device 1002 is configured to:

send the downlink data buffering indication to an AMF entity in the first mobile communication system, and send the downlink data buffering indication to the MME entity through the AMF entity.

In one embodiment, the first determining device 1001 is configured to:

determine that the SMF entity buffers the downlink data of the UE;

or, determine that the downlink data of the UE is buffered in the user plane function entity.

In one embodiment, the first sending device 1002 is further configured to:

receive a third request message sent by the AMF entity for requesting the session management context information of the UE before sending the downlink data buffering indication to the MME entity located in the second mobile communication system; and the third request message is sent after the AMF entity receives a second request message sent by the MME entity for requesting the context information of the UE and determines that the UE is in a reachable state;

determine that the UE is in the reachable state after moving to the second mobile communication system.

In one embodiment, the first determining device 1001 is further configured to:

forward the buffered downlink data of the UE to the user plane function entity after determining that the UE is in the reachable state after moving to the second mobile communication system when the downlink data of the UE is buffered in the SMF entity.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

It should be noted that the above functions performed by the MME entity shown in FIG. 7 and FIG. 9 and the above functions performed by the SMF entity shown in FIG. 8 and FIG. 10 are applicable to the scenarios in which the UE moves from the first mobile communication system to the second mobile communication system.

Figure 11:
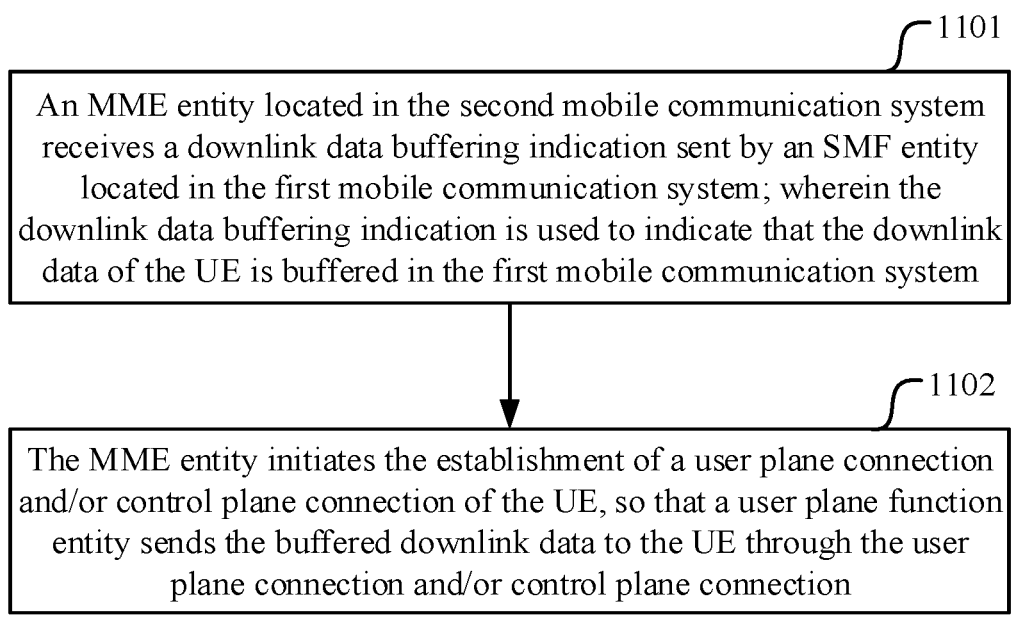
FIG. 11 is a flowchart of a first data transmission method of an embodiment of the present application.

As shown in FIG. 11, an embodiment of the present application provides a data transmission method when a UE moves from a first mobile communication system to a second mobile communication system, which includes:

Step 1101: an MME entity located in the second mobile communication system receives a downlink data buffering indication sent by an SMF entity located in the first mobile communication system; and the downlink data buffering indication is used to indicate that the downlink data of the UE is buffered in the first mobile communication system;

Step 1102: the MME entity initiates the establishment of a user plane connection and/or control plane connection of the UE, so that a user plane function entity sends the buffered downlink data to the UE through the user plane connection and/or control plane connection.

In one embodiment, the step in which the MME entity receives the downlink data buffering indication sent by the SMF entity located in the first mobile communication system includes:

the MME entity receives the downlink data buffering indication sent by the SMF entity through an AMF entity in the first mobile communication system.

In one embodiment, before the MME entity receives the downlink data buffering indication sent by the SMF entity located in the first mobile communication system, the method further includes:

the MME entity receives a first request message sent by the UE; and the first request message is sent after the UE moves from the first mobile communication system to the second mobile communication system;

the MME entity sends a second request message for requesting the context information of the UE to the AMF entity in the first mobile communication system, so that the AMF entity determines that the UE is in a reachable state after moving to the second mobile communication system and notifies the SMF entity after receiving the second request message, so that the SMF entity sends the downlink data buffering indication after determining that the UE is in the reachable state.

In one embodiment, the first request message is a TAU request message.

In one embodiment, the downlink data of the UE is buffered in a user plane function entity of the first mobile communication system;

or, the downlink data of the UE is buffered in the SMF entity of the first mobile communication system.

In one embodiment, the step in which the MME entity initiates the establishment of the user plane connection and/or control plane connection of the UE includes:

the MME entity determines to establish a user plane connection and/or control plane connection according to the context information of the UE.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

Figure 12:
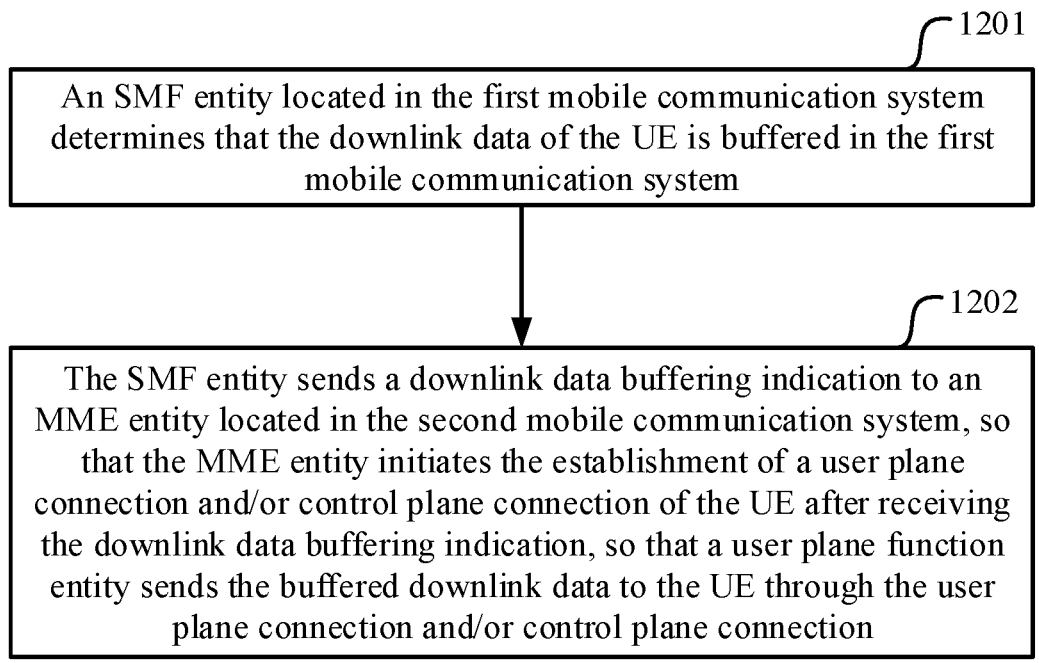
FIG. 12 is a flowchart of a second data transmission method of an embodiment of the present application.

As shown in FIG. 12, an embodiment of the present application provides another data transmission method when a UE moves from a first mobile communication system to a second mobile communication system, which includes:

Step 1201: an SMF entity located in the first mobile communication system determines that the downlink data of the UE is buffered in the first mobile communication system;

Step 1202: the SMF entity sends a downlink data buffering indication to an MME entity located in the second mobile communication system, so that the MME entity initiates the establishment of a user plane connection and/or control plane connection of the UE after receiving the downlink data buffering indication, so that a user plane function entity sends the buffered downlink data to the UE through the user plane connection and/or control plane connection.

In one embodiment, the step in which the SMF entity sends the downlink data buffering indication to the MME entity located in the second mobile communication system includes:

the SMF entity sends the downlink data buffering indication to an AMF entity in the first mobile communication system, and sends the downlink data buffering indication to the MME entity through the AMF entity.

In one embodiment, the step in which the SMF entity determines that the downlink data of the UE is buffered in the first mobile communication system includes:

the SMF entity determines that it buffers the downlink data of the UE;

or, the SMF entity determines that the downlink data of the UE is buffered in the user plane function entity.

In one embodiment, before the SMF entity sends the downlink data buffering indication to the MME entity located in the second mobile communication system, the method further includes:

the SMF entity receives a third request message sent by the AMF entity for requesting the session management context information of the UE; and the third request message is sent after the AMF entity receives a second request message sent by the MME entity for requesting the context information of the UE and determines that the UE is in a reachable state;

the SMF entity determines that the UE is in the reachable state after moving to the second mobile communication system.

In one embodiment, when the downlink data of the UE is buffered in the SMF entity, and after the SMF entity determines that the UE is in the reachable state after moving to the second mobile communication system, the method further includes:

the SMF entity forwards the buffered downlink data of the UE to the user plane function entity.

In one embodiment, the first mobile communication system is a 5GS system, and the second mobile communication system is an EPS system.

In one embodiment, the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

An embodiment of the present application provides a computer storable medium on which a computer program is stored, where the program, when executed by a processor, implements the steps of the above data transmission method after the UE moves from the first mobile communication system to the second mobile communication system.

Figure 13:
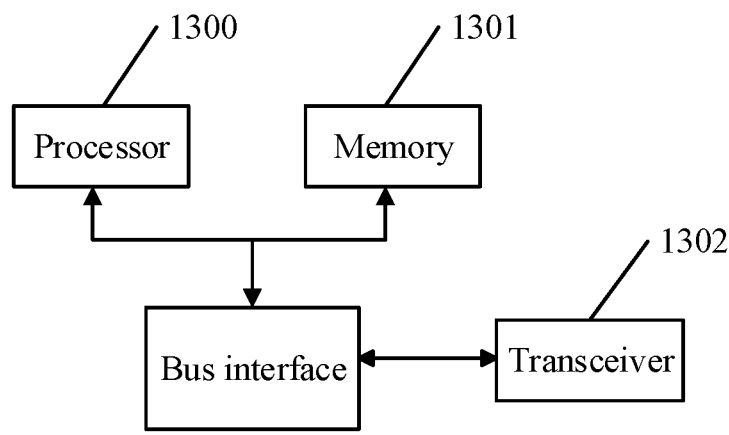
FIG. 13 is a structural schematic diagram of a third SMF entity of an embodiment of the present application.

As shown in FIG. 13, an embodiment of the present application provides a third SMF entity, which is located in a first mobile communication system and includes a processor 1300, a memory 1301, a transceiver 1302 and a bus interface.

The processor 1300 is responsible for managing the bus architecture and general processing, and the memory 1301 may store the data used by the processor 1300 when performing the operations. The transceiver 1302 is configured to receive and send the data under the control of the processor 1300.

The bus architecture may include any numbers of interconnected buses and bridges, and specifically link various circuits of one or more processors represented by the processor 1300 and the memory represented by the memory 1301. The bus architecture may further link various other circuits such as peripheral device, voltage regulator and power management circuit, which are all well known in the art and thus will not be further described again herein. The bus interface provides an interface. The processor 1300 is responsible for managing the bus architecture and general processing, and the memory 1301 may store the data used by the processor 1300 when performing the operations.

The procedure disclosed by the embodiment of the present application may be applied in the processor 1300 or implemented by the processor 1300. In the implementation process, each step of the signal processing flow may be completed by the integrated logic circuit of hardware in the processor 1300 or the instruction in the form of software. The processor 1300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1301, and the processor 1300 reads the information in the memory 1301 and completes the steps of the signal processing flow in combination with its hardware.

In one embodiment, the processor 1300 is configured to read the program in the memory 1301 and perform a process of:

receiving a downlink data buffering indication sent by an MME entity located in a second mobile communication system; and the downlink data buffering indication is used to indicate that the downlink data of a UE is buffered in the second mobile communication system;

activating a PDU session connection corresponding to the buffered downlink data of the UE, so that a user plane function entity sends the buffered downlink data to the UE through the PDU session connection.

In one embodiment, the processor 1300 is configured to:
receive the downlink data buffering indication sent by the MME entity through an AMF entity in the first mobile communication system.

In one embodiment, the processor 1300 is configured to:
determine a PDU session connection that needs to be activated according to a PDU session identifier sent by the AMF entity; and the PDU session identifier is determined by the AMF entity according to an EPS bearer identifier corresponding to the buffered downlink data of the UE that is received.

In one embodiment, the first mobile communication system is a 5GS system, and the second mobile communication system is an EPS system.

Figure 14:
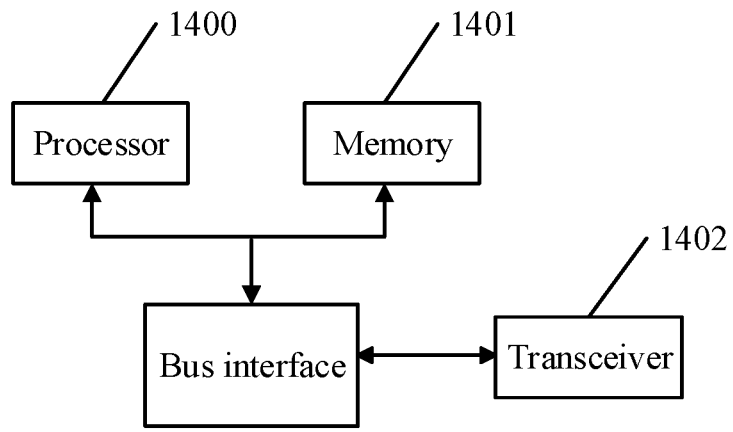
FIG. 14 is a structural schematic diagram of a first AMF entity of an embodiment of the present application.

As shown in FIG. 14, an embodiment of the present application provides a first AMF entity, which is located in a first mobile communication system and includes a processor 1400, a memory 1401, a transceiver 1402 and a bus interface.

The processor 1400 is responsible for managing the bus architecture and general processing, and the memory 1401 may store the data used by the processor 1400 when performing the operations. The transceiver 1402 is configured to receive and send the data under the control of the processor 1400.

The bus architecture may include any numbers of interconnected buses and bridges, and specifically link various circuits of one or more processors represented by the processor 1400 and the memory represented by the memory 1401. The bus architecture may further link various other circuits such as peripheral device, voltage regulator and power management circuit, which are all well known in the art and thus will not be further described again herein. The bus interface provides an interface. The processor 1400 is responsible for managing the bus architecture and general processing, and the memory 1401 may store the data used by the processor 1400 when performing the operations.

The procedure disclosed by the embodiment of the present application may be applied in the processor 1400 or implemented by the processor 1400. In the implementation process, each step of the signal processing flow may be completed by the integrated logic circuit of hardware in the processor 1400 or the instruction in the form of software. The processor 1400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1401, and the processor 1400 reads the information in the memory 1401 and completes the steps of the signal processing flow in combination with its hardware.

In one embodiment, the processor 1400 is configured to read the program in the memory 1401 and perform a process of:

receiving a downlink data buffering indication sent by an MME entity located in a second mobile communication system;

forwarding the downlink data buffering indication to an SMF entity located in the first mobile communication system, so that the SMF entity activates a PDU session connection corresponding to the buffered downlink data of a UE, so that a user plane function entity sends the buffered downlink data to the UE through the PDU session connection.

In one embodiment, the processor 1400 is further configured to:

receive a fourth request message sent by the UE before receiving the downlink data buffering indication sent by the MME entity located in the second mobile communication system; and the fourth request message is sent after the UE moves from the second mobile communication system to the first mobile communication system;

send a fifth request message for requesting the context information of the UE to the MME entity, so that the MME entity determines that the UE is in a reachable state after moving to the first mobile communication system after receiving the fifth request message and sends the downlink data buffering indication after determining that the UE is in the reachable state.

In one embodiment, the processor 1400 is further configured to:

receive an EPS bearer identifier corresponding to the buffered downlink data of the UE sent by the MME entity; map the EPS bearer identifier to a PDU session identifier; and send the PDU session identifier to the SMF entity, so that the SMF entity determines a PDU session connection that needs to be activated according to the PDU session identifier.

In one embodiment, the first mobile communication system is a 5GS system, and the second mobile communication system is an EPS system.

Figure 15:
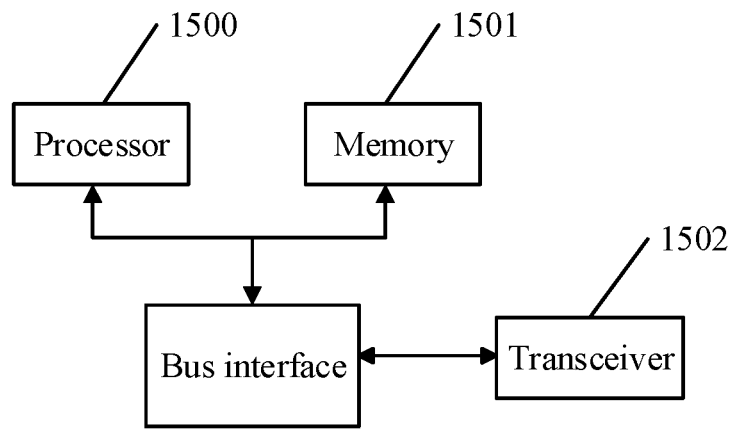
FIG. 15 is a structural schematic diagram of a third MME entity of an embodiment of the present application.

As shown in FIG. 15, an embodiment of the present application provides a third MME entity, which is located in a second mobile communication system and includes a processor 1500, a memory 1501, a transceiver 1502 and a bus interface.

The processor 1500 is responsible for managing the bus architecture and general processing, and the memory 1501 may store the data used by the processor 1500 when performing the operations. The transceiver 1502 is configured to receive and send the data under the control of the processor 1500.

The bus architecture may include any numbers of interconnected buses and bridges, and specifically link various circuits of one or more processors represented by the processor 1500 and the memory represented by the memory 1501. The bus architecture may further link various other circuits such as peripheral device, voltage regulator and power management circuit, which are all well known in the art and thus will not be further described again herein. The bus interface provides an interface. The processor 1500 is responsible for managing the bus architecture and general processing, and the memory 1501 may store the data used by the processor 1500 when performing the operations.

The procedure disclosed by the embodiment of the present application may be applied in the processor 1500 or implemented by the processor 1500. In the implementation process, each step of the signal processing flow may be completed by the integrated logic circuit of hardware in the processor 1500 or the instruction in the form of software. The processor 1500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1501, and the processor 1500 reads the information in the memory 1501 and completes the steps of the signal processing flow in combination with its hardware.

In one embodiment, the processor 1500 is configured to read the program in the memory 1501 and perform a process of:

determining that the downlink data of a UE is buffered in an SGW of the second mobile communication system;

sending a downlink data buffering indication to an SMF entity located in a first mobile communication system, so that the SMF entity activates a PDU session connection corresponding to the buffered downlink data of the UE, so that a user plane function entity sends the buffered downlink data to the UE through the PDU session connection.

In one embodiment, the processor 1500 is configured to: send the downlink data buffering indication to an AMF entity in the first mobile communication system, and send the downlink data buffering indication to the SMF entity through the AMF entity.

In one embodiment, the processor 1500 is further configured to:

before sending the downlink data buffering indication to the SMF entity located in the first mobile communication system, receive a fifth request message sent by the AMF entity for requesting the context information of the UE; and determine that the UE is in a reachable state after moving to the first mobile communication system.

In one embodiment, the processor 1500 is further configured to:

request the SGW to forward the buffered downlink data of the UE to the user plane function entity after determining that the UE is in the reachable state after moving to the first mobile communication system.

In one embodiment, the processor 1500 is further configured to:

send an EPS bearer identifier corresponding to the buffered downlink data of the UE to the AMF entity, so that the AMF entity determines a PDU session identifier according to the EPS bearer identifier.

In one embodiment, the first mobile communication system is a 5GS system, and the second mobile communication system is an EPS system.

Figure 16:
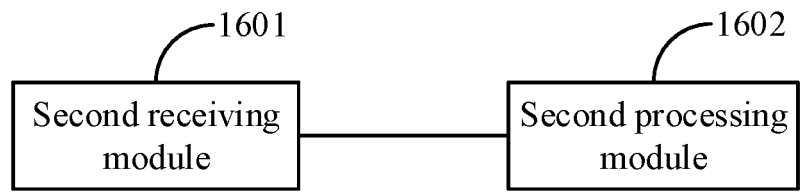
FIG. 16 is a structural schematic diagram of a fourth SMF entity of an embodiment of the present application.

As shown in FIG. 16, an embodiment of the present application provides a fourth SMF entity, which is located in a first mobile communication system and includes:

a second receiving device 1601 configured to receive a downlink data buffering indication sent by an MME entity located in a second mobile communication system; and the downlink data buffering indication is used to indicate that the downlink data of a UE is buffered in the second mobile communication system;

a second processing device 1602 configured to activate a PDU session connection corresponding to the buffered downlink data of the UE, so that a user plane function entity sends the buffered downlink data to the UE through the PDU session connection.

In one embodiment, the second receiving device 1601 is configured to:

receive the downlink data buffering indication sent by the MME entity through an AMF entity in the first mobile communication system.

In one embodiment, the second processing device 1602 is configured to:

determine a PDU session connection that needs to be activated according to a PDU session identifier sent by the AMF entity; and the PDU session identifier is determined by the AMF entity according to an EPS bearer identifier corresponding to the buffered downlink data of the UE that is received.

In one embodiment, the first mobile communication system is a 5GS system, and the second mobile communication system is an EPS system.

Figure 17:
FIG. 17 is a structural schematic diagram of a second AMF entity of an embodiment of the present application.

As shown in FIG. 17, an embodiment of the present application provides a second AMF entity, which is located in a first mobile communication system and includes:

a third receiving device 1701 configured to receive a downlink data buffering indication sent by an MME entity located in a second mobile communication system;

a second sending device 1702 configured to forward the downlink data buffering indication to an SMF entity located in the first mobile communication system, so that the SMF entity activates a PDU session connection corresponding to the buffered downlink data of a UE, so that a user plane function entity sends the buffered downlink data to the UE through the PDU session connection.

In one embodiment, the third receiving device 1701 is further configured to:

receive a fourth request message sent by the UE before receiving the downlink data buffering indication sent by the MME entity located in the second mobile communication system; and the fourth request message is sent after the UE moves from the second mobile communication system to the first mobile communication system;

send a fifth request message for requesting the context information of the UE to the MME entity, so that the MME entity determines that the UE is in a reachable state after moving to the first mobile communication system after receiving the fifth request message and sends the downlink data buffering indication after determining that the UE is in the reachable state.

In one embodiment, the third receiving device 1701 is further configured to:

receive an EPS bearer identifier corresponding to the buffered downlink data of the UE sent by the MME entity; map the EPS bearer identifier to a PDU session identifier; and send the PDU session identifier to the SMF entity, so that the SMF entity determines a PDU session connection that needs to be activated according to the PDU session identifier.

In one embodiment, the first mobile communication system is a 5GS system, and the second mobile communication system is an EPS system.

Figure 18:
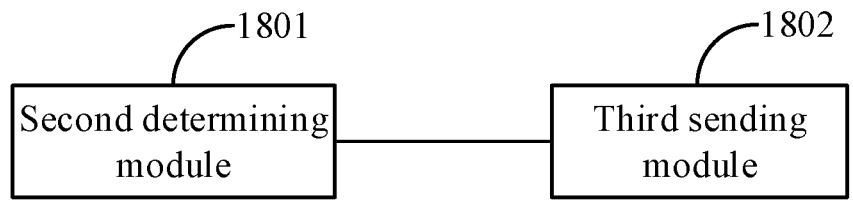
FIG. 18 is a structural schematic diagram of a fourth MME entity of an embodiment of the present application.

As shown in FIG. 18, an embodiment of the present application provides a fourth MME entity, which is located in a second mobile communication system and includes:

a second determining device 1801 configured to determine that the downlink data of a UE is buffered in an SGW of the second mobile communication system;

a third sending device 1802 configured to send a downlink data buffering indication to an SMF entity located in a first mobile communication system, so that the SMF entity activates a PDU session connection corresponding to the buffered downlink data of the UE, so that a user plane function entity sends the buffered downlink data to the UE through the PDU session connection.

In one embodiment, the third sending device 1802 is configured to:

send the downlink data buffering indication to an AMF entity in the first mobile communication system, and send the downlink data buffering indication to the SMF entity through the AMF entity.

In one embodiment, the third sending device 1802 is further configured to:

before sending the downlink data buffering indication to the SMF entity located in the first mobile communication system, receive a fifth request message sent by the AMF entity for requesting the context information of the UE; and determine that the UE is in a reachable state after moving to the first mobile communication system.

In one embodiment, the third sending device 1802 is further configured to:

request the SGW to forward the buffered downlink data of the UE to the user plane function entity after determining that the UE is in the reachable state after moving to the first mobile communication system.

In one embodiment, the third sending device 1802 is further configured to:

send an EPS bearer identifier corresponding to the buffered downlink data of the UE to the AMF entity, so that the AMF entity determines a PDU session identifier according to the EPS bearer identifier.

In one embodiment, the first mobile communication system is a 5GS system, and the second mobile communication system is an EPS system.

It should be noted that the above functions performed by the SMF entity shown in FIG. 13 and FIG. 16, the above functions performed by the AMF entity shown in FIG. 14 and FIG. 17, and the above functions performed by the MME entity shown in FIG. 15 and FIG. 18 are applicable to the scenarios in which the UE moves from the second mobile communication system to the first mobile communication system.

Figure 19:
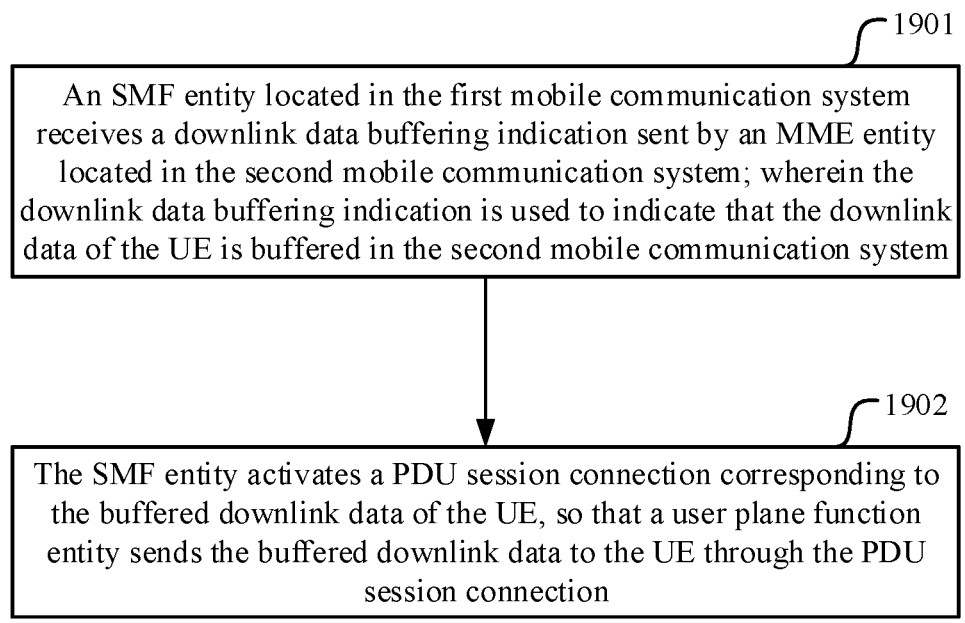
FIG. 19 is a flowchart of a third data transmission method of an embodiment of the present application.

As shown in FIG. 19, an embodiment of the present application provides a data transmission method when a UE moves from a second mobile communication system to a first mobile communication system, which includes:

Step 1901: an SMF entity located in the first mobile communication system receives a downlink data buffering indication sent by an MME entity located in the second mobile communication system; and the downlink data buffering indication is used to indicate that the downlink data of the UE is buffered in the second mobile communication system;

Step 1902: the SMF entity activates a PDU session connection corresponding to the buffered downlink data of the UE, so that a user plane function entity sends the buffered downlink data to the UE through the PDU session connection.

In one embodiment, the step in which the SMF entity receives the downlink data buffering indication sent by the MME entity located in the second mobile communication system includes:

the SMF entity receives the downlink data buffering indication sent by the MME entity through an AMF entity in the first mobile communication system.

In one embodiment, the step in which the SMF entity activates the PDU session connection corresponding to the buffered downlink data of the UE includes:

the SMF entity determines a PDU session connection that needs to be activated according to a PDU session identifier sent by the AMF entity; and the PDU session identifier is determined by the AMF entity according to an EPS bearer identifier corresponding to the buffered downlink data of the UE that is received.

In one embodiment, the first mobile communication system is a 5GS system, and the second mobile communication system is an EPS system.

Figure 20:
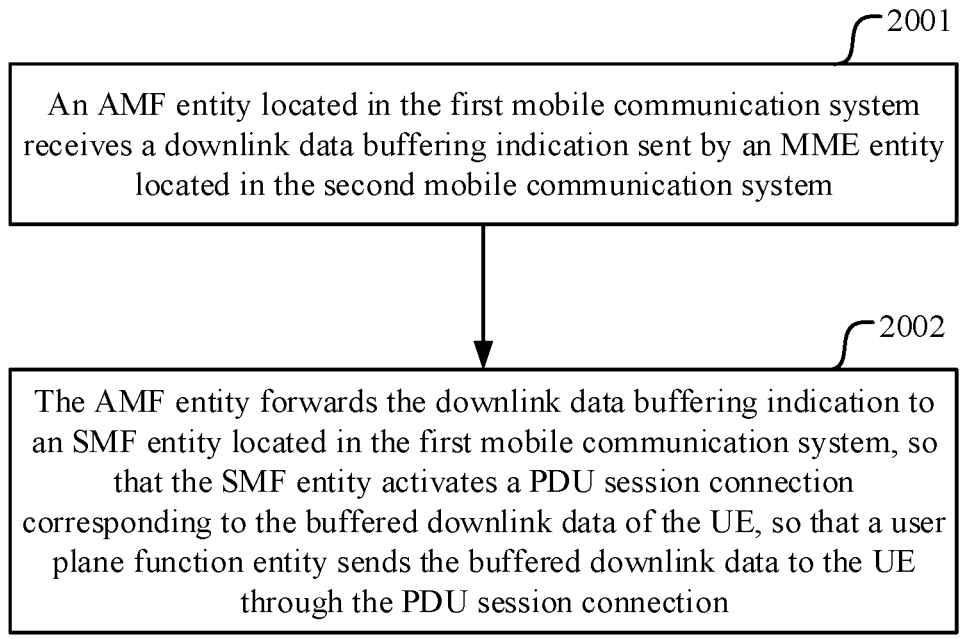
FIG. 20 is a flowchart of a fourth data transmission method of an embodiment of the present application.

As shown in FIG. 20, an embodiment of the present application provides another data transmission method when a UE moves from a second mobile communication system to a first mobile communication system, which includes:

Step 2001: an AMF entity located in the first mobile communication system receives a downlink data buffering indication sent by an MME entity located in the second mobile communication system;

Step 2002: the AMF entity forwards the downlink data buffering indication to an SMF entity located in the first mobile communication system, so that the SMF entity activates a PDU session connection corresponding to the buffered downlink data of the UE, so that a user plane function entity sends the buffered downlink data to the UE through the PDU session connection.

In one embodiment, before the AMF entity receives the downlink data buffering indication sent by the MME entity located in the second mobile communication system, the method further includes:

the AMF entity receives a fourth request message sent by the UE; and the fourth request message is sent after the UE moves from the second mobile communication system to the first mobile communication system;

the AMF entity sends a fifth request message for requesting the context information of the UE to the MME entity, so that the MME entity determines that the UE is in a reachable state after moving to the first mobile communication system after receiving the fifth request message and sends the downlink data buffering indication after determining that the UE is in the reachable state.

In one embodiment, the method further includes:

the AMF entity receives an EPS bearer identifier corresponding to the buffered downlink data of the UE sent by the MME entity;

the AMF entity maps the EPS bearer identifier to a PDU session identifier;

the AMF entity sends the PDU session identifier to the SMF entity, so that the SMF entity determines a PDU session connection that needs to be activated according to the PDU session identifier.

In one embodiment, the first mobile communication system is a 5GS system, and the second mobile communication system is an EPS system.

Figure 21:
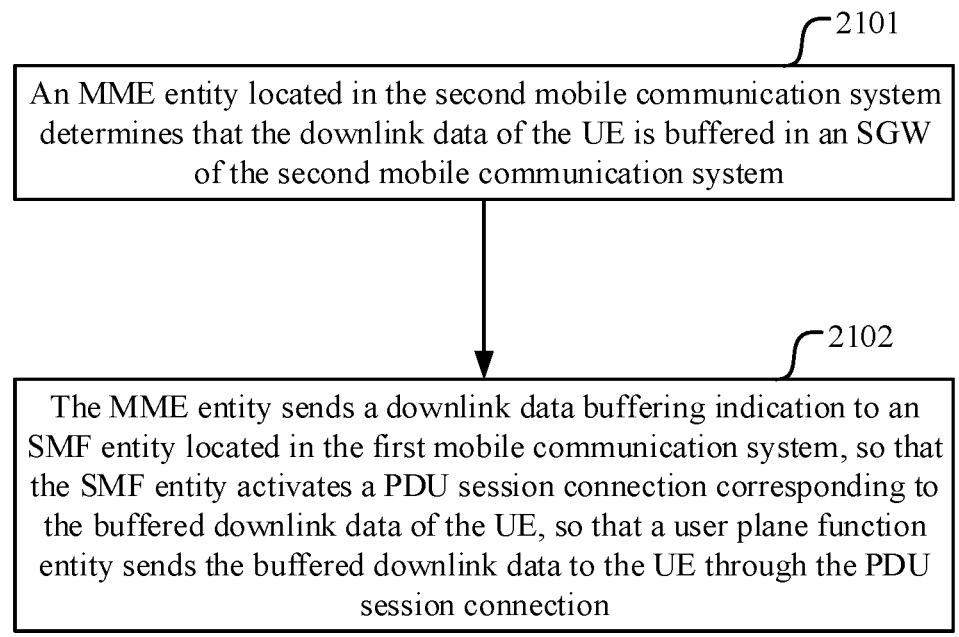
FIG. 21 is a flowchart of a fifth data transmission method of an embodiment of the present application.

As shown in FIG. 21, an embodiment of the present application provides another data transmission method when a UE moves from a second mobile communication system to a first mobile communication system, which includes:

Step 2101: an MME entity located in the second mobile communication system determines that the downlink data of the UE is buffered in an SGW of the second mobile communication system;

Step 2102: the MME entity sends a downlink data buffering indication to an SMF entity located in the first mobile communication system, so that the SMF entity activates a PDU session connection corresponding to the buffered downlink data of the UE, so that a user plane function entity sends the buffered downlink data to the UE through the PDU session connection.

In one embodiment, the step in which the MME entity sends the downlink data buffering indication to the SMF entity located in the first mobile communication system includes:

the MME entity sends the downlink data buffering indication to an AMF entity in the first mobile communication system, and sends the downlink data buffering indication to the SMF entity through the AMF entity.

In one embodiment, before the MME entity sends the downlink data buffering indication to the SMF entity located in the first mobile communication system, the method further includes:

the MME entity receives a fifth request message sent by the AMF entity for requesting the context information of the UE;

the MME entity determines that the UE is in the reachable state after moving to the first mobile communication system.

In one embodiment, after the MME entity determines that the UE is in the reachable state after moving to the first mobile communication system, the method further includes:

the MME entity requests the SGW to forward the buffered downlink data of the UE to the user plane function entity.

In one embodiment, the method further includes:

the MME entity sends an EPS bearer identifier corresponding to the buffered downlink data of the UE to the AMF entity, so that the AMF entity determines a PDU session identifier according to the EPS bearer identifier.

In one embodiment, the first mobile communication system is a 5GS system, and the second mobile communication system is an EPS system.

An embodiment of the present application provides a computer storable medium on which a computer program is stored, where the program, when executed by a processor, implements the steps of the above data transmission method after the UE moves from the second mobile communication system to the first mobile communication system.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions.

These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A data transmission method, comprising:

receiving, by a Mobility Management Entity, MME, located in a second mobile communication system, a downlink data buffering indication sent by a Session Management Function, SMF, entity located in a first mobile communication system; wherein the downlink data buffering indication is used to indicate that downlink data of a UE is buffered in the first mobile communication system;

initiating, by the MME entity, an establishment of a user plane connection and/or control plane connection of the UE, so that a user plane function entity sends the buffered downlink data to the UE through the user plane connection and/or control plane connection, wherein before the receiving, by the MME entity, the downlink data buffering indication sent by the SMF entity located in the first mobile communication system, the method further comprises:

receiving, by the MME entity, a first request message sent by the UE; wherein the first request message is sent after the UE moves from the first mobile communication system to the second mobile communication system;

sending, by the MME entity, a second request message for requesting context information of the UE to the AMF entity in the first mobile communication system, so that the AMF entity determines that the UE is in a reachable state after moving to the second mobile communication system and notifies the SMF entity after receiving the second request message, so that the SMF entity sends the downlink data buffering indication after determining that the UE is in the reachable state.

2. The method of claim 1, wherein the receiving, by the MME entity, a downlink data buffering indication sent by the SMF entity located in the first mobile communication system, comprises:

receiving, by the MME entity, the downlink data buffering indication sent by the SMF entity through an Access and Mobility Management Function, AMF, entity in the first mobile communication system.

3. The method of claim 1, wherein the first request message is a Tracking Area Update, TAU, request message.

4. The method of claim 1, wherein the downlink data of the UE is buffered in a user plane function entity of the first mobile communication system;

or, the downlink data of the UE is buffered in the SMF entity of the first mobile communication system.

5. The method of claim 1, wherein initiating, by the MME entity, establishment of a user plane connection and/or control plane connection of the UE, comprises:

determining, by the MME entity, to establish the user plane connection and/or control plane connection according to context information of the UE.

6. The method of claim 1, wherein the first mobile communication system is a 5GS system, and the second mobile communication system is an EPS system;

wherein the user plane connection refers to a connection in which the downlink data is sent to a base station via a serving gateway (SGW) and then sent by the base station to the UE via a data radio bearer;

the control plane connection refers to a connection in which the downlink data is sent to the MME entity via the SGW and then sent by the MME entity to the UE via an NAS message.

7. A data transmission method, comprising:

determining, by an SMF entity located in a first mobile communication system, that downlink data of a UE is buffered in the first mobile communication system;

sending, by the SMF entity, a downlink data buffering indication to an MME entity located in a second mobile communication system, so that the MME entity initiates establishment of a user plane connection and/or control plane connection of the UE after receiving the downlink data buffering indication, so that a user plane function entity sends buffered downlink data to the UE through the user plane connection and/or control plane connection, wherein before the sending by the SMF entity, the downlink data buffering indication to the MME entity located in the second mobile communication system, the method further comprises:

receiving, by the SMF entity, a third request message sent by the AMF entity for requesting session management context information of the UE; wherein the third request message is sent after the AMF entity receives a second request message sent by the MME entity for requesting context information of the UE and determines that the UE is in a reachable state;

determining, by the SMF entity, that the UE is in the reachable state after moving to the second mobile communication system.

8. The method of claim 7, wherein sending, by the SMF entity, a downlink data buffering indication to an MME entity located in a second mobile communication system, comprises:

sending, by the SMF entity, the downlink data buffering indication to an AMF entity in the first mobile communication system, and sending the downlink data buffering indication to the MME entity through the AMF entity.

9. The method of claim 7, wherein determining, by the SMF entity, that the downlink data of the UE is buffered in the first mobile communication system, comprises:

determining, by the SMF entity, that it buffers the downlink data of the UE;

or, determining, by the SMF entity, that the downlink data of the UE is buffered in the user plane function entity.

10. The method of claim 7, wherein when the downlink data of the UE is buffered in the SMF entity, and after the determining by the SMF entity, that the UE is in the reachable state after moving to the second mobile communication system, the method further comprises:

forwarding, by the SMF entity, the buffered downlink data of the UE to the user plane function entity.

11. The method of claim 7, wherein the first mobile communication system is a 5GS system, and the second mobile communication system is an EPS system;

wherein the user plane connection refers to a connection in which the downlink data is sent to a base station via an SGW and then sent by the base station to the UE via a data radio bearer;

the control plane connection refers to a connection in which the downlink data is sent to the MME entity via the SGW and then sent by the MME entity to the UE via an NAS message.

12. A data transmission method, comprising:

receiving, by an AMF entity located in a first mobile communication system, a downlink data buffering indication sent by an MME entity located in a second mobile communication system;

forwarding, by the AMF entity, the downlink data buffering indication to an SMF entity located in the first mobile communication system, so that the SMF entity activates a PDU session connection corresponding to buffered downlink data of a UE, so that a user plane function entity sends the buffered downlink data to the UE through the PDU session connection, wherein before the receiving, by the AMF entity, the downlink data buffering indication sent by the MME entity located in the second mobile communication system, the method further comprises:

receiving, by the AMF entity, a fourth request message sent by the UE; wherein the fourth request message is sent after the UE moves from the second mobile communication system to the first mobile communication system;

sending, by the AMF entity, a fifth request message for requesting context information of the UE to the MME entity, so that the MME entity determines that the UE is in a reachable state after moving to the first mobile communication system after receiving the fifth request message and sends the downlink data buffering indication after determining that the UE is in the reachable state.

13. The method of claim 12, further comprises:

receiving, by the AMF entity, an EPS bearer identifier corresponding to the buffered downlink data of the UE sent by the MME entity;

mapping, by the AMF entity, the EPS bearer identifier to a PDU session identifier;

sending, by the AMF entity, the PDU session identifier to the SMF entity, so that the SMF entity determines a PDU session connection that needs to be activated according to the PDU session identifier.

14. The method of claim 12, wherein the first mobile communication system is a 5GS system, and the second mobile communication system is an EPS system.

15. An MME entity, being located in a second mobile communication system and comprising a processor and a memory;
   wherein the processor is configured to read a program in the memory and perform the method according to claim 1.

16. An SMF entity, being located in a first mobile communication system and comprising a processor and a memory;
   wherein the processor is configured to read a program in the memory and perform the method according to claim 7.

17. An AMF entity, being located in a first mobile communication system and comprising a processor and a memory;
   wherein the processor is configured to read a program in the memory and perform the method according to claim 12.

* * * * *